April 7, 1959     R. A. TILMANN     2,880,717

GAS BURNING SPACE HEATER

Filed March 17, 1955

RICHARD A. TILMANN.
INVENTOR.

BY Eugene C. Knoblock
ATTORNEY

United States Patent Office 2,880,717
Patented Apr. 7, 1959

2,880,717

GAS BURNING SPACE HEATER

Richard A. Tilmann, Elkhart, Ind., assignor, by mesne assignments, to Cribben and Sexton Company, a corporation of Illinois Application March 17, 1955, Serial No. 494,987

5 Claims. (Cl. 126—110)

This invention relates to improvements in gas burning space heaters, although it may be equipped with an oil burner. More particularly the invention relates to a gas burning space heater of the type adapted for use in a vehicle, such as a trailer coach, which uses bottled gas as a source of fuel.

The primary object of the invention is to provide a space heater which is economical and efficient in operation, attractive in appearance, compact in size and shape, easy to manufacture and assemble, and inexpensive to construct and operate.

A further object is to provide a device of this character having a novel arrangement of parts to direct flow of products of combustion and of air to be heated therethrough so as to secure streamlined air flow, highly efficient heat transfer, and a maximum heat output rate compared to the quantity of fuel consumed.

A further object is to provide a device of this character having inlets for recirculated air and fresh air, respectively, means for guiding air from said inlets to a junction, and means for directing the air from that junction past the primary heat transfer portion of the device in a common stream.

A further object is to provide a device of this character having a combustion chamber equipped with heat transfer surfaces, wherein the device has a passage for directing fresh air past a preheating zone having heat transfer surfaces subject to the influence of products of combustion discharged from the combustion chamber prior to directly impinging the air against the heat transfer surfaces of the combustion chamber.

A further object is to provide a device of this character having two separated inlets for air to be heated, each leading to a venturi in which is located a fan for drawing air to the venturi from both inlets and for directing the same past a heat transfer member in a plurality of divided or separated paths accommodating heat transfer from all portions of the heat transfer means, said paths merging at one or more outlets for discharge in a predetermined direction.

A further object is to provide a heater of this character, wherein a combustion chamber is provided with a plurality of gas burners and with baffle means for deflecting the products of combustion, said combustion chamber being equipped with means for preventing recirculation of the products of combustion in a path leading to the air inlet for the burner.

A further object is to provide a gas burning space heater having gas burners and means associated therewith for preventing impingement thereagainst of products of combustion thereof, so as to insure an adequate supply of air to support combustion and to maintain combustion at an economical and efficient rate.

A further object is to provide a heater adapted to be mounted in a space to be heated adjacent to a source of fresh air and provided with means for dividing the fresh air into two paths to respectively support combustion and to be heated and circulated, wherein means are provided in the path of the air to support combustion so oriented and located as to prevent air gusts from extinguishing the flame of the burner.

Other objects will be apparent from the following specification.

Figure 1:
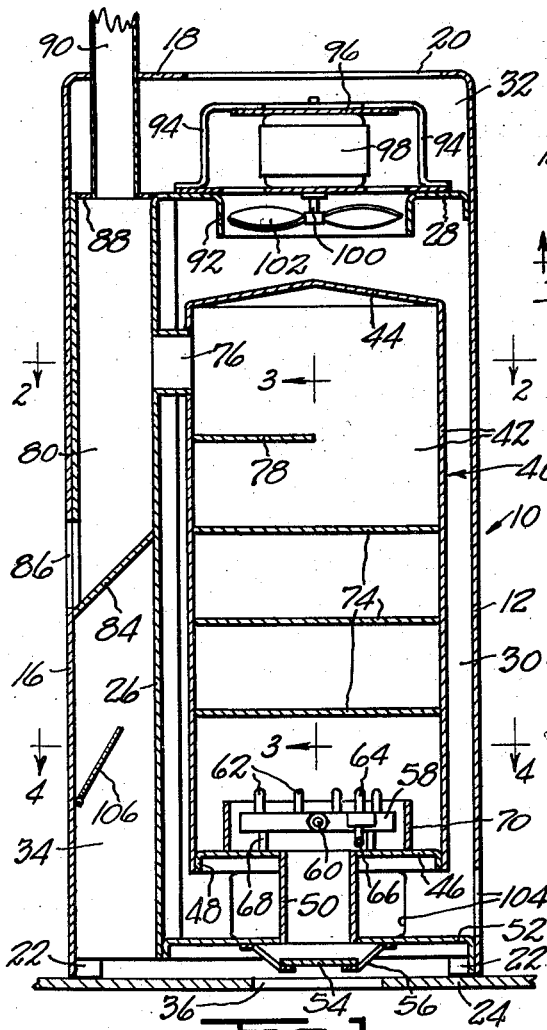
Fig. 1 is a vertical sectional view taken on line 1—1 of Fig. 2.

Referring to the drawing which illustrates the preferred embodiment of the invention, the numeral 10 designates the outer housing of the heater having a front wall 12, a pair of vertical side walls 14, a rear wall 16, and a top wall 18 provided with an aperture 20. The aperture 20 will preferably be spanned by a grill or other reticulated member (not shown), as is well understood in the art. The housing 10 is preferably supported with its vertical panels in an elevated position by means of depending leg or foot portions 22 preferably located at the corners thereof. It will be understood, however, that the housing may eliminate such legs and its bottom edges may rest upon the floor or other supporting surface 24.

The housing 10 is partitioned. A vertical partition 26, preferably substantially parallel to and spaced from the rear panel 16, extends for the major portion of the height of the housing 10 with its bottom edge preferably being spaced above the level of the floor 24, as seen in Fig. 1, and its top edge terminating spaced below the top 18. A horizontal partition 28 is associated with the upper margin of the partition 26 and preferably spans the interior of the casing 10 between partition 26 and front wall 12. The horizontal partition 28 cooperates with the partition 26, the front wall 12, the side walls 14, and a bottom panel 52 to define a heat transfer chamber 30. A chamber 32 is formed in the upper part of the housing or casing 10 above the partition 28 and constitutes an air-mixing chamber. A vertical passage 34 is provided between the rear wall 16 and the vertical partition 26 and is adapted to direct air upwardly from the fresh air inlet, such as the aperture 36 in the floor 24, or any other air inlet such as the space below the bottom edge of one or more panels 10 of the casing, both as seen in Fig. 1. The passage 34 communicates with the air-mixing chamber 32 at its upper end.

A heat transfer unit 40 is located within the heat transfer chamber 30 and consists of a chamber having vertical walls 42 spaced from the vertical walls of the chamber 30 substantially uniformly. Thus, where the heat transfer chamber 30 is rectangular in horizontal cross-sectional shape, as here illustrated, each of the panels or side walls 42 of the heat transfer unit 40 will be spaced substantially parallel to one of the walls 12, 14, 26 of the heat transfer chamber 30 and in substantially the same spacing from the latter walls. It will be understood, of course, that the cross-sectional shape of the casing 10 and of the heat transfer unit 40 may not be rectangular and may be of any other shape found suitable. The heat transfer chamber 40 has a top 44 spanning and closing the upper end thereof. The top panel 44 will preferably be configured with its central portion at highest elevation, and said panel being inclined downwardly from said highest portion in all directions. Thus in the event of a rectangularly shaped transfer unit 40, the top 44 will preferably be of substantially pyramidal form or conical form. The top 44 will be spaced below the partition 28 and preferably the spacing between the parts 44 and 28 will be greater than the spacing between the vertical walls 42 of the member 40 and the associated walls of the heat transfer chamber 30.

The lower end of the heat transfer unit 40 terminates spaced above the level of the bottom of the casing 10 and is preferably spanned by a bottom plate 46 fixedly secured to the lower margins of the upright walls 42 by a substantially airtight or sealed joint, as by means of welding downturned flanges 48 of the plate 46 to the lower margins of the upright walls 42. The plate 46 has a central opening with which communicates a pipe or conduit 50 fixedly secured thereto at substantially its center so as to support the heat transfer member 40 and to constitute the sole means for supplying air thereto. It will be understood that one or more conduits 50 may be provided. The conduit 50 is supported by a plate 52 which spans and seals the lower end of the heat transfer chamber 30 at an elevation above the floor 24. The plate 52 will preferably be welded or otherwise fixedly and sealingly connected to the vertical panels 12, 14 and 26 which outline the heat transfer chamber 30. It will be understood that the bottom closure plate 52 has an aperture therein with which the conduit 50 communicates for the passage of air through said conduit and into the interior of the heat transfer or combustion chamber 40.

In the preferred construction of the device, a baffle plate 54 is positioned spaced below the lower end or mouth of the conduit 50 and above the level of the floor 24 and is substantially centered relative to the conduit 50 and of a size at least equal to the cross-sectional size of the conduit 50. A plurality of supporting spider members 56 are carried by the bottom member 52 spaced around the conduit 50 and serve to position the baffle plate 54 spaced below and in line with the inlet of the conduit 50.

A burner unit is located in the bottom of the combustion chamber unit 40 and preferably constitutes a manifold or endless tubular conduit member 58 connected by a conduit 60 with a source of combustible gas under pressure, such as bottled gas. The conduit 60 will preferably have associated therewith suitable valves (not shown) for controlling the rate of supply of fuel therethrough, which valves may include valves associated with thermostatic or other controls to respond to the demand for heat of the space or room within which the heater is located. A plurality of burners 62 of any suitable construction and character, depending upon the nature of the fuel and other considerations well understood in the art, will be carried by and will communicate with the tubular member 58. The combustion unit will preferably include one or more burners 64 which may be supported by the member 58 but not communicating therewith. Such secondary burners 64 will preferably be supplied with fuel by a second conduit 66 communicating with the source of fuel and also provided with valve means (not shown) which may be controlled either manually or thermostatically, as is well understood in the art. The member 58 will preferably be supported in an elevated position above the bottom plate 46 of the combustion chamber by suitable supporting legs 68.

A skirt member 70 extends around the burner member 58 in outwardly spaced relation thereto. The member 70 is supported on the panel 46 inwardly from the side walls 42 of the combustion chamber a substantially uniform distance. Any suitable anchoring means 72 may be employed to hold the skirt member 70 in desired position. The skirt member 70 will preferably extend from the plate 46 against which it bears to an elevation at least equal to or projecting above the member 58, as illustrated, and preferably will terminate at a level adjacent or slightly below the upper ends of the burners 62.

Figure 2:
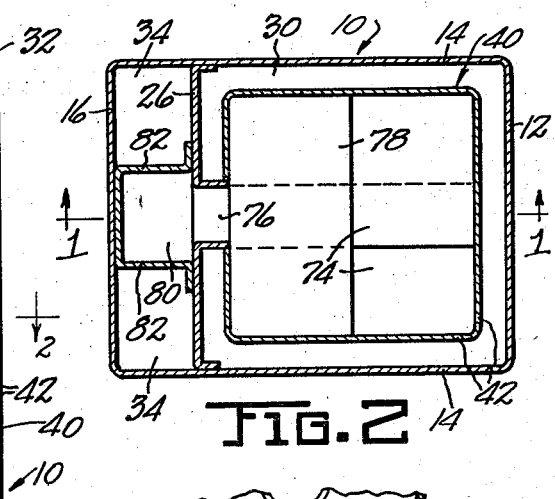
Fig. 2 is a horizontal sectional view taken on line 2—2 of Fig. 1.
Figure 3:
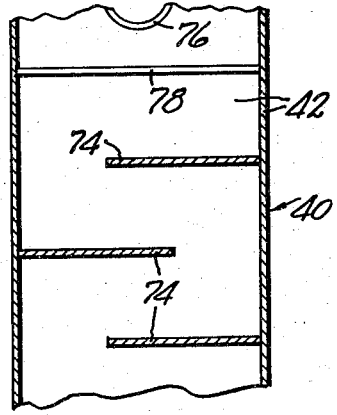
Fig. 3 is a fragmentary vertical sectional view taken on line 3—3 of Fig. 1.

The combustion chamber 40 is provided with a plurality of baffles for directing the products of combustion from the burners 62, 64 upwardly through the chamber 40 in a circuitous path. As here illustrated, a plurality of baffle members 74 are arranged in alternate relation to span opposite portions of the chamber 40 and preferably partially overlap at their central portions. As illustrated in Figs. 2 and 3, the lowermost baffle 74 spans the major cross-sectional portion of the combustion chamber at one side thereof. The intermediate baffle 74 spans the major portion from the opposite side thereof, and the highest baffle 74 substantially registers with the lowest baffle 74. By reason of the partial overlap of these baffles, a circuitous path of the products of combustion is required as the same pass from the burners 62, 64 in an upward direction toward a stack opening 76 with which a conduit communicates for connection with a stack structure to be described. A baffle 78 is located between the uppermost baffle 74 and the outlet 76 and extends forwardly from the wall of the combustion chamber in which the opening 76 is formed, so that its free edge extends substantially perpendicularly to the free edges of the baffles 74, as illustrated in Fig. 2. This arrangement insures that the path of flow of the products of combustion from each of the burners 62 and 64 will be substantially of equal length.

A restricted discharge chamber 80 communicates with the outlet passage 76 and is located within the casing 10 in the upper portion of the chamber 34 thereof. The chamber 80 is preferably defined by upright panels 82 spanning the space between the panels 16 and 26 in substantially equispaced relation to the side walls 14 of the casing 10 and preferably extend from a level approximately coincident with the partition 28 downwardly into spaced relation below the outlet 76. A bottom panel 84 closes the lower end of the chamber 80 and an opening 86 in the rear wall 16 communicates with the chamber 80 above the level of the bottom plate 84 so that air may move in the chamber 82 from the inlet 86 past the outlet passage 76 in an upward flow. The upper end of the chamber 80 is spanned by a plate 88 substantially at the same level as the partition 28. The plate 88 has a central opening therein with which is connected a stack 90 which passes upwardly through the housing and through the aperture in the top panel 18 of the housing.

The partition 28 has an opening therein substantially centered with the combustion chamber 40 and defined in part by a flange or sleeve 92 depending from the partition but terminating spaced above the top 44 of the combustion chamber 40. The sleeve 92 defines a venturi. A spider or other support 94 is carried by the partition 28 and extends upwardly therefrom to support a plate or base 96 mounting an electric motor 98 whose shaft 100 depends vertically therefrom and is substantially centered relative to the venturi sleeve 92. The shaft mounts fan blades 102 which are located within the venturi sleeve 92. Any suitable means may be provided for control of the fan motor 98, such means being preferably associated with thermostats or like means responding to the temperature of the space within which the heater is located and also responding to or preferably controlling the valves for controlling the supply of fuel to the burners through the conduits 60 and 66, as well understood in the art. The fan motor 98 will preferably be a two-speed unit so that the same may operate at one speed when fuel is being supplied to the main burners 62 of the heater, at a lower speed when fuel is being supplied to a standby or low heat output burner or burners 64, and may be deenergized when the burners are inoperative. It will be understood that the electrical circuits included in the device will be conventional and may include ignition means or pilot means for insuring ignition of the burners 62 and 64 upon occurrence of a demand for heat.

When the device is insntalled as described above juxtaposed to a fresh air source 36, air entering said source will be divided in two paths. A part of the air will pass around the baffle 54 to enter the conduit 50 and pass into the combustion chamber to support the combustion of fuel by the burners 62 and 64. The other path of flow of air from inlet 36 will be through passage 34 around and on each side of the chamber 80 and into the upper mixing chamber 32. The fresh air will be mixed with recirculating air entering the housing 10 through the opening 20 in the top 18 of the casing. The mixture of fresh and recirculated air will then be drawn downwardly through the venturi sleeve 92 by the fan 100 to be discharged into the heat transfer chamber 30 within which it is divided to pass downwardly along the outer surfaces of the combustion chamber walls 42 after having been diverted laterally by the inclined top 44 of the combustion chamber. One or more hot air outlets 104 will be formed in the casing 10 as at the lower portions of the vertical walls 12 or 14 thereof. These outlets will preferably be at a level below the bottom of the combustion chamber 40 so that air must pass the full length of the combustion chamber in order to reach the outlets 104. Each outlet 104 will preferably be spanned by a grill or reticulated member (not shown), as well understood in the art.

The path of flow of air described above entails tempering or heating of the fresh air as it flows upwardly through the passage 34 and particularly as it passes around the outlet chamber 80 receiving the products of combustion and delivering them to the stack 90. Thus by the time the air reaches the mixing chamber 32 its temperature will have been elevated or tempered as compared to its temperature at inlet. As the air mixture is forced downwardly by the fan 102 it is caused to pass in intimate heat transferring relation to the chamber 40 so that it becomes heated effectively before it is discharged into the space to be heated through the outlets 104. The rate of flow of fresh air into the device may be controlled by suitable damper means 106 located within the passage 34 so as to maintain control of the ratio between fresh air and recirculated air. For this purpose it will be understood that the damper 106 may be adjustable, if used.

Heat transfer to the air is insured to be of maximum efficiency by the baffle structure 74, 78 within the combustion chamber 40 arranged to divert or direct the products of combustion in a circuitous path to concentrate heat adjacent the heat transfer wall surfaces 42. Also, it will be observed that upon stopping of the fan 102 any convection flow of air through the casing 10 from outlets 104 around the combustion chamber 40 can be discharged through the venturi sleeve 92 and the inlet passage 20 into the room or space to be heated. Thus as the combustion chamber cools during a period when no demand for heat exists, it will give up its heat through heat transfer to the air, thereby insuring efficiency of operation at low operating cost.

Figure 4:
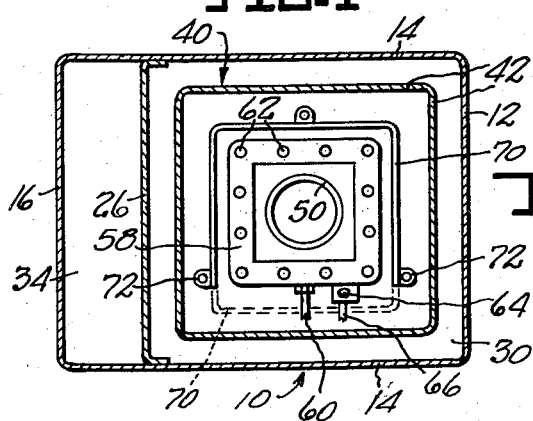
Fig. 4 is a horizontal sectional view taken on line 4—4 of Fig. 1.

One of the important features of the device is the provision of the skirt 70 encircling the burner construction and spaced from the side walls of the combustion chamber 40. This skirt serves to prevent recirculation of the spent gases or products of combustion in a path intercepting the path of air from the air supply conduit 50. Inasmuch as the combustion chamber 40 is baffled, eddy currents of the products of combustion may occur which result in the downward deflection of some of the products of combustion by the lowermost baffle in a manner tending to reach the burners. The skirt 70 prevents the products of combustion from mixing with incoming air or otherwise reducing the air supply at the burners. Thus it is possible to insure that an adequate supply of air to maintain the necessary fuel-air ratio for combustion of maximum efficiency will be provided. It will be understood that inasmuch as the lowermost baffle 74 is located at one side only of the combustion chamber, the skirt 70 need only be located at that portion of the device as at the side thereof below the lowermost baffle at which eddy currents of the products of combustion are likely to occur as deflected by the lowermost baffle. Thus the skirt 70 may either be of substantially U-shape, as illustrated in full lines only in Fig. 4, or may be substantially continuous, as illustrated by the full and dotted lines in Fig. 4.

While the device has been illustrated as equipped with a gas burner, other burners may be employed, and particularly an oil burner of the so-called "pot type" or "Breese" type, well known in the art. It will be understood that adjustment of the air inlet and fuel supply means, together with overflow valves and other protective means commonly supplied with oil burners, as well understood in the art, will be provided with the oil burner.

While the preferred embodiment of the invention has been illustrated and described herein, it will be understood that changes in the construction may be made within the scope of the appended claims without departing from the spirit of the invention.

I claim:

1. A space heater comprising a casing having a fresh air inlet at the bottom and a recirculation air inlet at the top thereof, a vertically extending partition in said casing defining a heat transfer chamber and a fresh air flow passage, a transverse wall in and adjacent the top of said casing and forming therewith an air-mixing chamber communicating with said fresh air flow passage and said recirculation inlet, means including a fan supported by the transverse wall for propelling mixed fresh and recirculated air into said heat transfer chamber, a combustion chamber unit in said heat transfer chamber having clearance for air passage therearound, a heated air outlet in said casing adjacent the bottom thereof communicating with said heat transfer chamber, means for supplying combustion air to said combustion chamber unit, and flue means communicating with said combustion chamber unit and extending in the direction of and in heat exchange relation to the fresh air flow in said fresh air flow passage whereby substantially only fresh air is contacted with said flue means carrying combustion products from said combustion chamber unit to pre-heat said fresh air with waste heat.

2. A space heater of the character set forth in claim 1 wherein said flue means comprises a chamber formed in said fresh air flow passage by said partition and said casing and by other vertically extending partition means connecting said first mentioned partition and said casing.

3. A space heater of the character set forth in claim 1 wherein said casing includes a bottom wall for said heat transfer chamber and said combustion unit includes a bottom wall, and wherein the means for supplying combustion air to said combustion chamber unit is a conduit connecting the bottom wall of said combustion chamber unit to the bottom wall of said heat transfer chamber and communicating with the fresh air inlet of said casing whereby substantially all fresh air is supplied to said combustion chamber unit as combustion air.

4. A space heater of the character set forth in claim 1 wherein damper means are provided in said fresh air flow passage permitting closure of said passage whereby when said fan is inoperative only recirculated air will flow upwardly in said heat transfer chamber from said heated air outlet to said mixing chamber and recirculation air outlet.

5. In a space heater for a trailer, or the like, a casing having an air-mixing chamber adjacent the top thereof, recirculation air inlet means in the top of said casing communicating with the said air-mixing chamber, outside air inlet means in the bottom of said casing, vertically-extending outside air flow means in said casing, vertically-extending mixed air flow means in said casing separated from said outside air flow means and having a heated air outlet adjacent the bottom of said casing, both of said flow means communicating with said air-mixing chamber, blower means in the bottom of said air-mixing chamber for directing air therefrom into said mixed air flow means, combustion heating means in said mixed air flow means, flue means communicating with said combustion means and extending in the direction of and in heat exchange relation to outside air flowing in the outside air flow means below the communication of said outside air flow means with said air-mixing chamber.

References Cited in the file of this patent

UNITED STATES PATENTS

| | | |
|---|---|---|
| 1,169,448 | Williams | Jan. 25, 1916 |
| 1,455,018 | Caldwell | May 15, 1923 |
| 2,141,649 | Grill et al. | Dec. 27, 1938 |
| 2,144,093 | Williams | Jan. 17, 1939 |
| 2,157,109 | Bell | May 9, 1939 |
| 2,318,476 | Evans | May 4, 1943 |
| 2,380,110 | Huwer | July 10, 1945 |
| 2,464,473 | Wessel | Mar. 15, 1949 |
| 2,625,150 | Little | Jan. 13, 1953 |
| 2,658,503 | Scheurer | Nov. 10, 1953 |
| 2,716,976 | Pinatelli | Sept. 6, 1955 |
| 2,792,826 | Kilbury | May 21, 1957 |

FOREIGN PATENTS

| | | |
|---|---|---|
| 6,579 | Great Britain | of 1887 |